(12) United States Patent
Hansson et al.

(10) Patent No.: US 10,178,009 B2
(45) Date of Patent: *Jan. 8, 2019

(54) METHOD, A COMPUTER PROGRAM PRODUCT, AND A CARRIER FOR INDICATING ONE-WAY LATENCY IN A DATA NETWORK

(71) Applicant: Accedian Networks Inc., Saint-Laurent (CA)

(72) Inventors: Kjell Hansson, Rimbo (SE); Olof Hagsand, Alta (SE)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,630

(22) Filed: Jul. 18, 2017

(65) Prior Publication Data

US 2018/0006919 A1     Jan. 4, 2018

Related U.S. Application Data

(63) Continuation of application No. 15/341,514, filed on Nov. 2, 2016, now Pat. No. 9,736,049, which is a (Continued)

(30) Foreign Application Priority Data

Sep. 22, 2004 (SE) ...................................... 0402280

(51) Int. Cl.
*H04L 12/26* (2006.01)
*H04L 29/06* (2006.01)
(Continued)

(52) U.S. Cl.
CPC ........ *H04L 43/0858* (2013.01); *H04J 3/0682* (2013.01); *H04L 65/608* (2013.01); *H04L 2212/00* (2013.01)

(58) Field of Classification Search
CPC .............. H04L 65/608; H04L 43/0858; H04L 2212/00
See application file for complete search history.

(56) References Cited

U.S. PATENT DOCUMENTS 6,545,979 B1   4/2003  Poulin
6,665,315 B1   12/2003 Karasawa
(Continued)

FOREIGN PATENT DOCUMENTS

EP     1215559 A2    6/2002

OTHER PUBLICATIONS

European Search Report for European Application No. 05779215.2, dated Sep. 27, 2013 (6 pages).
(Continued)

*Primary Examiner* — Gbemileke J Onamuti
(74) *Attorney, Agent, or Firm* — Stratford Managers Corporation

(57) ABSTRACT

Disclosed herein is a method, a computer program product, and a carrier for indicating one-way latency in a data network (N) between a first node (A) and a second node (B), wherein the data network (N) lacks continuous clock synchronization, comprising: a pre-synchronisation step, a measuring step, a post-synchronisation step, an interpolation step, and generating a latency profile. The present invention also relates to a computer program product incorporating the method, a carrier comprising the computer program product, and a method for indicating server functionality based on the first aspect.

32 Claims, 6 Drawing Sheets

Related U.S. Application Data continuation of application No. 15/057,224, filed on Mar. 1, 2016, now Pat. No. 9,544,210, which is a continuation of application No. 14/745,676, filed on Jun. 22, 2015, now Pat. No. 9,300,556, which is a continuation of application No. 14/576,972, filed on Dec. 19, 2014, now Pat. No. 9,094,427, which is a continuation of application No. 14/194,885, filed on Mar. 3, 2014, now Pat. No. 8,948,210, which is a continuation of application No. 13/494,652, filed on Jun. 12, 2012, now Pat. No. 8,705,577, which is a continuation of application No. 11/662,646, filed as application No. PCT/SE2005/001307 on Sep. 9, 2005, now Pat. No. 8,218,576.

(51) Int. Cl.
*H04J 3/07* (2006.01)
*H04J 3/06* (2006.01)

(56) References Cited

U.S. PATENT DOCUMENTS

| | | | |
|---|---|---|---|
| 7,113,485 B2 | 9/2006 | Bruckman | |
| 7,114,091 B2 | 9/2006 | Vrancic | |
| 7,286,482 B2 | 10/2007 | Charcranoon | |
| 8,218,576 B2 | 7/2012 | Hansson | |
| 8,705,577 B2 | 4/2014 | Hansson | |
| 2001/0000071 A1 | 3/2001 | Nichols | |
| 2002/0066012 A1 | 5/2002 | Relander | |
| 2003/0048754 A1 | 3/2003 | Bruckman | |
| 2003/0048811 A1 | 3/2003 | Robie, Jr. et al. | |
| 2003/0091029 A1 | 5/2003 | Jo et al. | |
| 2003/0093513 A1* | 5/2003 | Hicks | H04L 41/22 709/224 |
| 2003/0177154 A1* | 9/2003 | Vrancic | G06F 1/12 708/160 |
| 2004/0105391 A1 | 6/2004 | Charcranoon | |
| 2014/0177654 A1 | 6/2014 | Hansson | |

OTHER PUBLICATIONS

Fasbender et al., "On Assessing Unidirectional Latencies in Packet-Switched Networks,"IEEE vol. 1, Jun. 8, 1997 (5 pages).
International Search Report for International Application No. PCT/SE2005/001307, filed Sep. 9, 2005, dated Dec. 6, 2005 (4 pages).
International Written Opinion for International Application No. PCT/SE2005/001307, filed Sep. 9, 2005, dated Dec. 6, 2005 (5 pages).

* cited by examiner

METHOD, A COMPUTER PROGRAM PRODUCT, AND A CARRIER FOR INDICATING ONE-WAY LATENCY IN A DATA NETWORK

CROSS REFERENCE TO RELATED APPLICATIONS

This application is a continuation of and claims priority to U.S. patent application Ser. No. 15/341,514, filed Mar. 1, 2016, now allowed, which is a continuation of and claims priority to U.S. patent application Ser. No. 15/057,224, filed Mar. 1, 2016, now U.S. Pat. No. 9,544,210, which is a continuation of U.S. patent application Ser. No. 14/745,676, filed Jun. 22, 2015, now U.S. Pat. No. 9,300,556, which is a continuation of U.S. patent application Ser. No. 14/576,972, filed Dec. 19, 2014, now U.S. Pat. No. 9,094,427, which is a continuation of U.S. patent application Ser. No. 14/194,885, filed Mar. 3, 2014, now U.S. Pat. No. 8,948,210, which is a continuation of U.S. patent application Ser. No. 13/494,652, filed Jun. 12, 2012, now U.S. Pat. No. 8,705,577, which is a continuation of U.S. patent application Ser. No. 11/662,646, filed Mar. 13, 2007, now U.S. Pat. No. 8,218,576, which is a U.S. national stage of International Application No. PCT/SE2005/001307, filed Sep. 9, 2005, which claims the benefit of Sweden Patent Application No. 0402280-2, filed Sep. 22, 2004, each of which is hereby incorporated by reference herein in its entirety.

TECHNICAL FIELD

According to a first aspect, the present invention relates to a method for indicating one-way latency in a data network without continuous clock synchronization between a first node and a second node.

According to a second aspect, the present invention relates to a computer program product incorporating the first aspect.

According to a third aspect, the present invention relates to a carrier comprising the computer program product.

According to a fourth aspect, the present invention relates to a method for indicating server functionality based on the first aspect.

BACKGROUND OF INVENTION

In the art, it is possible to achieve one-way real-time latency measurement by using synchronized clocks, such as GPS technology. It is possible to use the standard NTP protocol to achieve a level of synchronization between nodes, as described in Mills, D "Network Time Protocol (Version 3) specification, implementation and analysis", IETF RFC 1305, University of Delaware, March 1992. However, the NTP mechanism does not have a very high accuracy.

In US2003/0048811 A1, with the title "Methods, systems and computer program products for synchronizing clocks of nodes on a computer network", discloses an algorithm for clock synchronization between two nodes using virtual clocks, a generalization of the clock synchronization for many nodes, and using many round-trip-delays to compute an average one-trip delay. A key feature of the invention described in the US document, is that each node manages a virtual clock for every other node it synchronizes with.

SUMMARY OF INVENTION

According to the present invention and the first aspect, a method for indicating one-way latency in a data network, without continuous clock synchronization, between a first node and a second node is disclosed. The method comprises:
a pre-synchronisation step,
a measuring step,
a post-synchronisation step,
an interpolation step, and
generating a latency profile.

Based on the present invention, also a computer program product loadable into the internal memory of a computer, comprising software code portions for performing the method, a carrier comprising the computer program product, and a method for indicating server functionality are disclosed. This implies that the present invention is applicable when measuring or monitoring, qualities of a server.

The present invention according to the present invention presents a number of advantages in relation to prior art. For instance, the accuracy of the measurements of the present invention is higher than the accuracy of the NTP mechanism. The present invention deals with a method for making one-way real-time latency measurements with a high precision between nodes connected by a message-passed network where clock synchronization of that precision is not available, which is in contrast to the prior art briefly discussed above. The method may also present individual per-packet latency values. The present invention performs high precision latency measurements of packets travelling between two nodes over a limited period of time. Since latencies may be asymmetric, round-trip estimation may not be used, but it must be relied on absolute and synchronous time. Also, continuous clock synchronization does not have to established, nor maintained. Instead, the present invention makes two synchronizations (before and after) with the single goal to interpolate the measurement results.

In a preferred embodiment, the pre-synchronisation step comprises sending a predetermined message from the first node to the second node. Then, at the first node, a predetermined message sent by the second node is received. The next step is to calculate an offset according to $((T_2-T_1)+(T_3-T_4))/2$, where $T_1$ is the sending time from the first node, $T_2$ is the receiving time at the second node, $T_3$ is the sending time at the second node, and $T_4$ is the receiving time at the first node. Thereafter, a clock difference is set to the offset. Also, an absolute clock is set to $T_4$.

In a preferred embodiment, the pre-synchronisation step comprises sending the predetermined message N times, and the predetermined message is received N times. However, there may be cases where all N messages are not received. In such cases, there will be gaps in the correspondence of the data sent and received. This may be handled by not using the measured values associated to the missing messages. Then N, or a number less than N, round-trip-time items are generated. This is done according to $T_{i,4}-T_{i,1}-(T_{i,3}-T_{i,2})$, where i is in the interval [1 . . . N]. N offset items, or a number of offset items less than N, as described above is generated. The minimum round-trip-time item is retrieved and the clock difference is set to the offset related to the minimum round-trip-time item, and the absolute clock is set to $T_{i,4}$ for the i having the minimum round-trip-time item.

In a preferred embodiment, the method further comprises the step of measuring the overhead for making measurements at the sender.

In a preferred embodiment, the method further comprises the step of measuring the overhead for making measurements at the receiver.

In a preferred embodiment, the measuring step comprises sending a predetermined message from the first node to the second node and storing the sending time for the sending.

The predetermined message is received at the second node, the receiving time for the receiving is stored.

In a preferred embodiment, the measuring step comprises sending a predetermined message from the first node to the second node N times chronologically equidistantly, and the sending time for each sending is stored. The predetermined message is received at the second node, and the receiving time for each receiving is stored. Hopefully, the message is received N times at the second node. Otherwise this may be handled as described above.

In a preferred embodiment, wherein the post-synchronisation step is constituted by the pre-synchronisation step as defined above.

In a preferred embodiment, the interpolation step comprises calculating the one-way latency in the data network between a first node and a second node according to the following relations:

rate bias=(offset of the post-synchronisation step−
offset of the pre-synchronisation step)/(absolute
clock for post-synchronisation step-absolute
clock for the pre-synchronisation), and latency=the time at which the second node received
the predetermined message−(the time at which
the first node sent the predetermined message+
the offset of the pre-synchronisation step+(the
time at which the first node sent the predetermined message−the absolute clock of the pre-synchronisation step)).

In a preferred embodiment, the interpolation step comprises calculating the one-way latency in the data network between a first node and a second node according to the above for the messages sent between the first and second nodes.

In a preferred embodiment, the method further comprises an overhead term corresponding to the overhead for making measurements at least one of the first and second nodes, and the one-way latency in the data network between a first node and a second node is calculated according to:

latency=the time at which the second node received
the predetermined message−(the time at which
the first node send the predetermined message+
the offset of the pre-synchronisation step+rate
bias(the time at which the first node sent the
predetermined message−the absolute clock of
the pre-synchronisation step))−the overhead
term.

In a preferred embodiment, in the interpolation step, the one-way latency in the data network between a first node and a second node is calculated according to the above for the N messages sent between the first and second nodes. Alternatively in case all N messages were not received, this is done for the received messages.

It also lies within the scope of the present invention that it is possible to operate in relation to more nodes than a single one. Of course, the present invention may be used to operate against a plurality of nodes.

DESCRIPTION OF PREFERRED EMBODIMENTS

Figure 1:
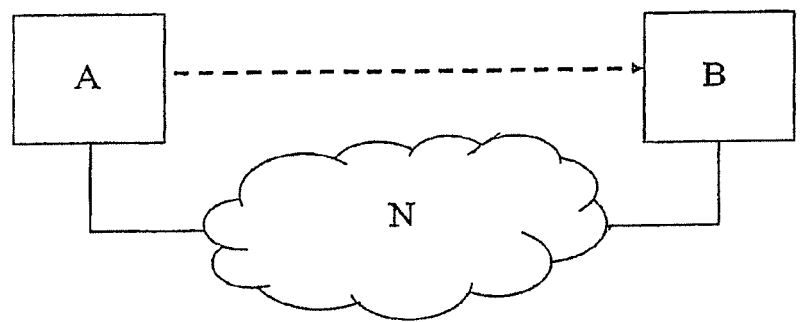
In FIG. 1, an embodiment of two nodes, A and B, interconnected by a network N are schematically depicted.

In a first embodiment, a system with two nodes A and B interconnected by a communication network N is depicted in FIG. 1. The nodes communicate by sending messages (packets) over the network N. A measurement is performed from a node A to a node B, where A is called a requesting node, and B is called a responding node. Each node may work both as a requesting node and a responding node. A node can also perform measurements with more than one other node. For example, A can perform a measurement with a third node C (not disclosed in FIG. 1) at the same time. The network N may be an inter-network running the IP protocol. This enables any nodes with an IP-interface and an IP protocol stack to communicate with each other over N.

Figure 2:
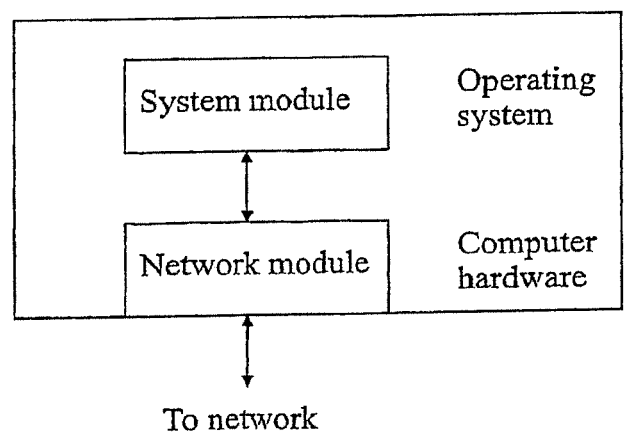
In FIG. 2, an embodiment of an architecture of a node is schematically depicted.

In FIG. 2, an embodiment of a node is shown. The computer node is equipped with a network interface card that can communicate using IP. Such a node has a CPU, memory buses, disks, etc., that enables it to operate as a computer. The node runs an operating system, in which the system software can be implemented. This embodiment is implemented as a software module running in an operating system of such a node.

Figure 3:
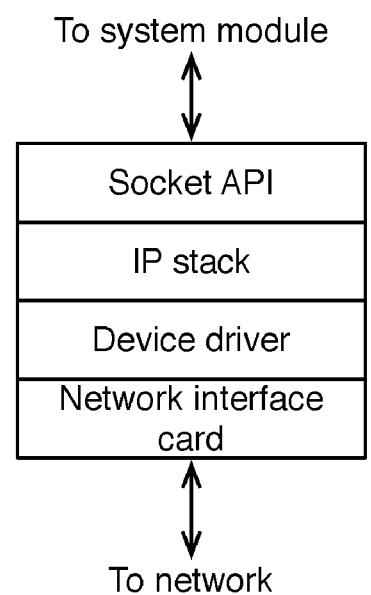
In FIG. 3, an embodiment of a network module is schematically depicted.

In FIG. 3, an embodiment of a network module is shown. The software module implementing the method described in this document needs to have access to a network module. The network module shown in FIG. 3 typically consists of a network interface card, a device driver, an IP stack and a socket API. The network interface card enables the node to physically connect to an access network. The device driver contains software enabling the IP stack to access the network services on the network interface card. The IP stack contains full implementation of the communication protocols that enables the node to communicate over the internet. This may be the set of protocols referred to as TCP/IP. The socket API is a functional interface that the system module can access in order to send and receive packets to and from the network.

In an embodiment, a system module implementing the invention may be implemented as a user application in an operating system. It requires a socket API to access the network in order to send and receive packets over the network.

The nodes communicate with messages over the network. There are two kinds of messages:
Synchronization messages
Measurement messages Both types of messages may be encapsulated over the IP protocol using the UDP/IP transport protocol or some other non-reliable datagram service. In an embodiment, both types of messages are encoded with the RTP protocol.

A synchronization message is either a request (syncreq) or response (syncresp). The request message is sent by the requesting node and received by a responding node. A response is sent by a responding node when it receives a syncreq message. The syncresp message is received by the requesting node.

The syncreq message contains the following fields: a sequence number and a time-stamp T1.

The syncresp message contains the following fields: a sequence number and three timestamps: T1, T2, and T3. The semantics of the message fields are as follows: Sequence number—The requesting node sets the sequence number incrementally (0, 1, 2, etc.). The responder copies the sequence number from a syncreq to a syncresp message. The sequence number is used to detect packet loss, reordering or duplications on the network. Timestamp T1. The time when the syncreq message was sent by the requesting node. Timestamp T2. The time when the syncreq message was received by the responding node. Timestamp T3. The time the syncresp message was sent by the responding node.

The measurement messages are sent from the requesting node to the responding node only. The measurement message contains a sequence field and a timestamp field T1.

The semantic of the message fields are as follows:
Sequence number—The requesting node sets the sequence number incrementally (0, 1, 2, etc.). The responder copies the sequence number from a syncreq to a syncresp message. The sequence number is used to detect packet loss, reordering or duplications on the network.
Timestamp T1. The time when the measurement message was sent by the requesting node.
Timestamp T2. The time when the syncreq message was received by the responding node
Timestamp T3. The time the syncresp message was sent by the responding node.

The measurement messages are sent from the requesting node to the responding node only. The measurement message contains a sequence field and a timestamp field T1.

The semantic of the message fields are as follows:
The sequence number. The requesting node sets the sequence number incrementally (0, 1, 2, etc.).
Timestamp T1. The time when the measurement message was sent by the requesting node.

Now referring to the inventive method, both nodes have high accuracy clocks that are not synchronized with each other. High accuracy means that they are linear with respect to each other over a limited time period on the order of minutes, and that they have high resolution, at least to the level of 1 microsecond. That is, the clocks have different rates, but the rate difference is constant over time.

The method is divided into five steps:
P1—Synchronization1
P2—Measurement
P3—Synchronization2
P4—Interpolation and
Generating a latency profile.

In Table 1 below an embodiment of constants used to parameterize the method are given. The values given to the constants are merely an example; the method can be used also for other values.

TABLE 1

| Constant Name | Description | Example values |
| --- | --- | --- |
| SNR | Number of syncreq messages sent. | 50 |
| NM | Number of measurement messages sent. | 10000 |
| DT | Delay between sending of measurement messages. | 20 ms |

In Table 2 below, variables used in this method are explained.

TABLE 2

| Variable name | Description |
| --- | --- |
| NSREQ | Number of syncreq messages sent. |
| NSRESP | Number of syncresp messages received. |
| T1 | Time when message was sent by requesting node. |
| T2 | Time when message was received by responding node. |
| T3 | Time when message was sent by responding node. |
| T4 | Time when message was received by requesting node. |
| RTT | Round-trip-time |
| RTTMIN | The smallest RTT value during a synchronization phase. |
| CABS0 | Wall clock of a synchronization message in the P1 phase |
| CDIFF0 | The difference/offset between the two clocks at a synchronization message in the P1 phase |
| CABS1 | Wall clock of a synchronization message in the P3 phase |
| CDIFF2 | The difference/offset between the two clocks at a synchronization message in the P3 phase |
| SEQ | Sequence number set by requesting node. |
| A [ ] | Vector containing T1 for all measurement messages. |
| B [ ] | Vector containing T2 for all measurement messages. |
| L [ ] | Vector containing the resulting one-way latencies, or the latency profile. |
| Ks | Overhead of sending a message |
| Kr | Overhead of receiving a message |
| RATEBIAS | Difference in rate between the two clocks |
| VALID [ ] | Vector of boolean values determining the validity of the entries in A [ ], B [ ] and L [ ] |

The output of the present invention is a latency profile, which is the vector containing the resulting one-way latencies, or L[ ].

Figure 4:
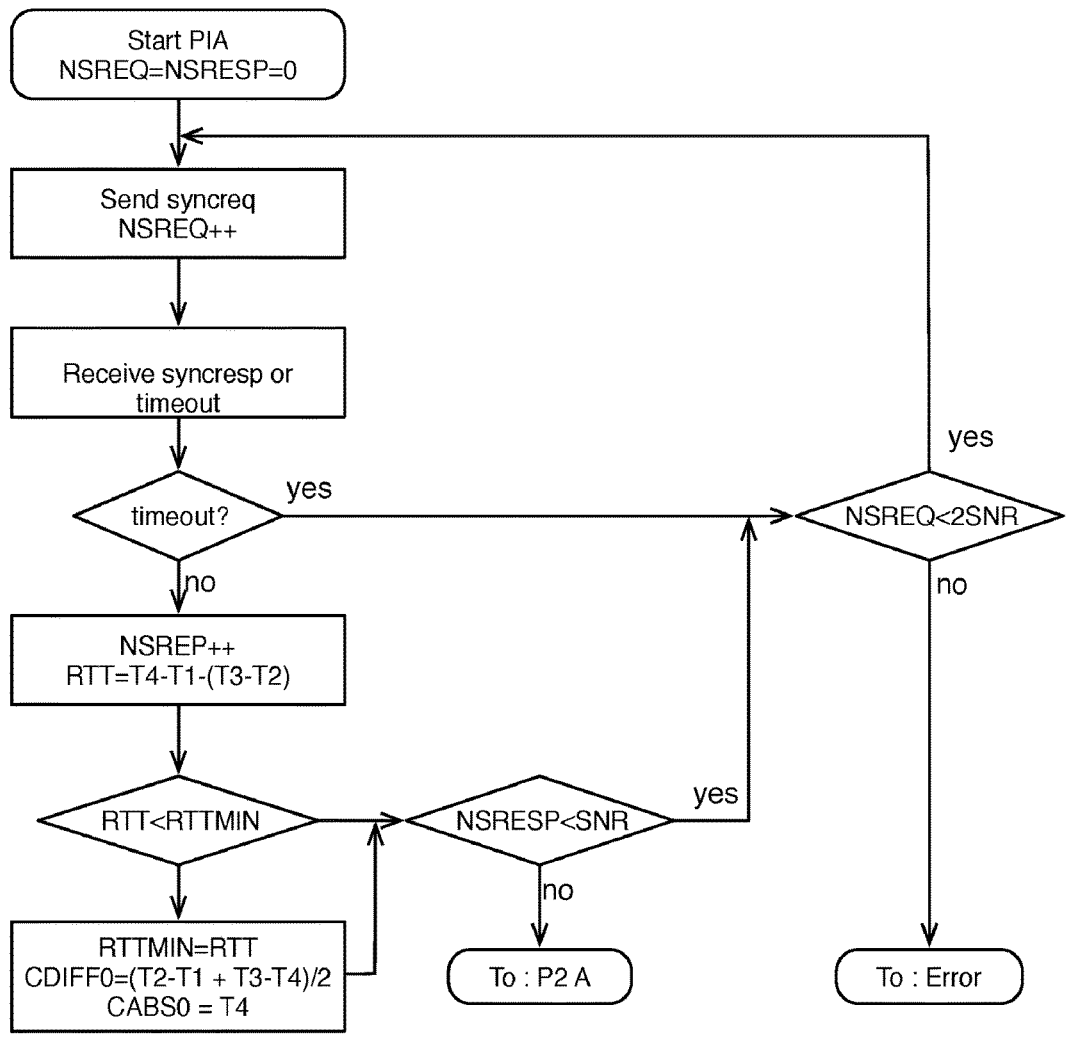
In FIG. 4, an embodiment of a requestor node pre-synchronization flowchart is schematically depicted.

In FIG. 4, an embodiment of a requestor node pre-synchronization flowchart is schematically depicted. The node sends a syncreq to the responding node. It sets the sequence number and the T1 timestamp in the syncreq message. Then it waits for a reply to come back from the responding node, or for a timeout to occur. If a syncreq message was received, a timestamp T4 is registered when the syncresp message was received. Together with the three timestamps T1, T2 and T3, the module tries to find the message with the smallest round-trip-time. This message is used to find the two values CABS0 and CDIFF0 and is used in the interpolation method P4. The method uses two variables NSREQ and NSRESP to record the number of sent syncreq messages and received syncresp messages, respectively. These variables are used as a terminating condition. If the module sends 2SNR syncreq messages without having received SNR syncresp messages, this is an error. As soon as the module has received SNR syncresp messages, it continues to the next phase, P2A. SNR is a predefined constant, typically 50 messages. The method may also use the variables RTT and RTT_MIN. RTT_MIN is pre-set to a large value, and is used to find the syncreq/syncresp pair with the smallest round-trip-time. This measurement is then used to compute the CABS and CDIFF values. In other words, we claim that the best measurement is the one with the smallest RTT. Many other methods use the mean value. Note that the method described in FIG. 4 may be implemented somewhat differently. For example, the sending and receiving of messages can be made concurrently, not sequentially as is shown in the figure. In that case, two processes are created, one that is sending syncreq messages regularly, and one that is waiting for syncresp messages. In that case, a timeout need not be made. Instead, a delay between the sending of syncreq messages need to be introduced.

Figure 5:
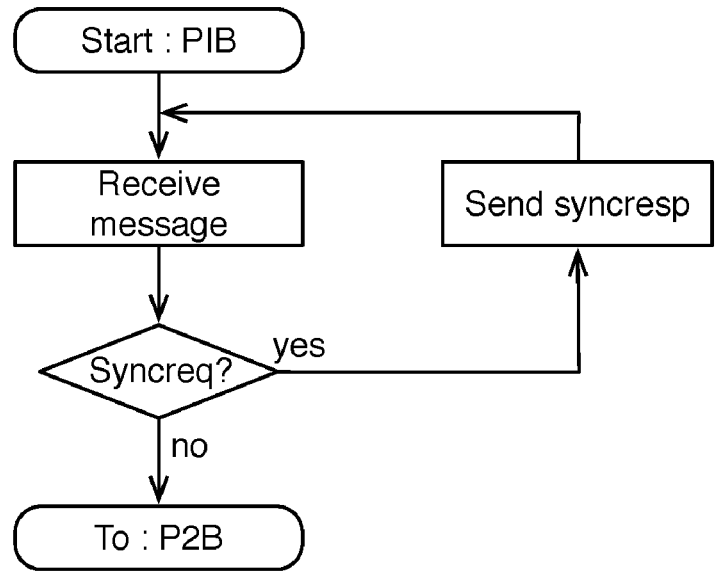
In FIG. 5, an embodiment of a responder node pre-synchronization flowchart is schematically depicted.

In FIG. 5, an embodiment of a responder node pre-synchronization flowchart is schematically depicted. The node waits for a syncreq from the requesting node. When such a message is received, it creates a syncresp message, copies the sequence number and T1 from the syncreq message, records T2 and T3, and sends the syncresp message back to the requesting node. If the received message is not a syncreq message, it is assumed that it is a measurement message which is handled in P2B. The size of the vectors is equal to the number of measurement messages sent.

The measurement phase consists of the requesting node periodically sending measurement messages to the responding node. The responding node records the timestamps of the time of sending and the time of receiving the messages in two vectors A[ ] and B[ ], respectively. The size of the vectors is equal to the number of measurement messages sent, NM. The two vectors are later used in P4.

Figure 6:
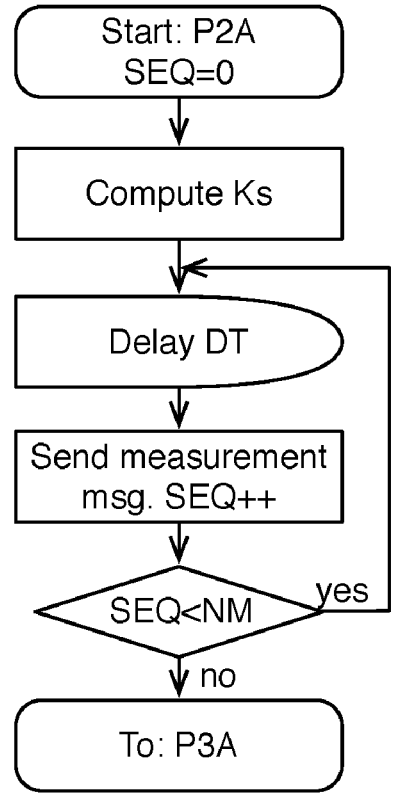
In FIG. 6, an embodiment of a flowchart of requesting node in the measurement phase is schematically depicted.

In FIG. 6, an embodiment of a flowchart of requesting node in the measurement phase is schematically depicted. The requesting node sends NM messages (for example 10000) with interval DT between each packet (for example 20 ms). Each syncreq message will contain SEQ, the sequence number; and T1, the time the message was sent. The overhead of sending a message Ks is computed initially. This is the difference in time from when the timestamp was taken and when the message was actually sent. Ks may be set to 0 if the node lacks the capability to compute this time.

Figure 7:
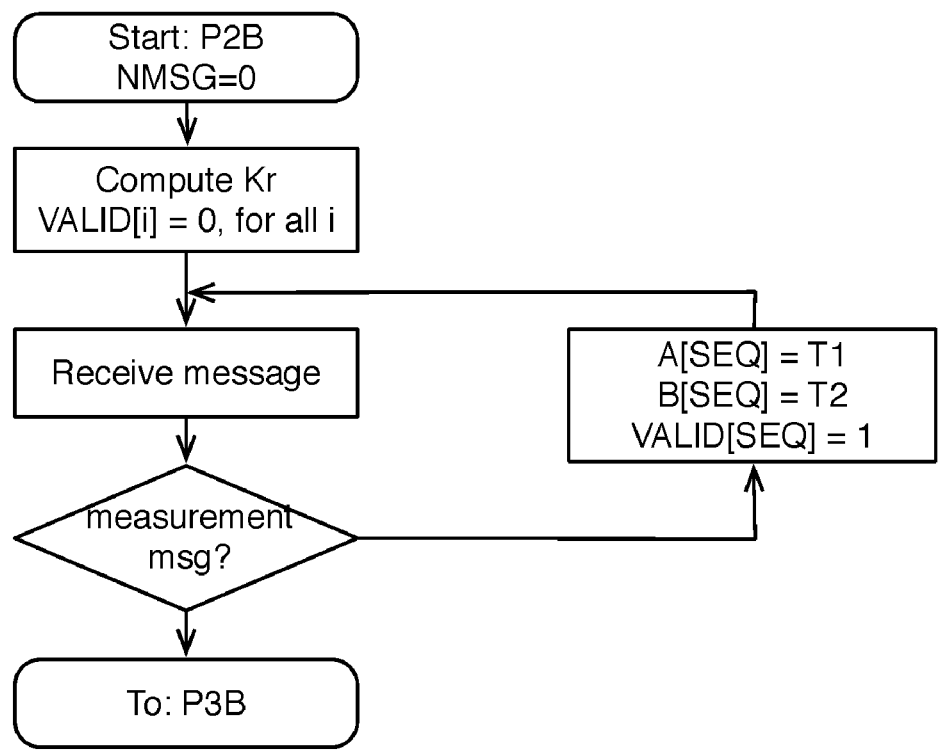
In FIG. 7, an embodiment of a flowchart of the responding node in the measurement phase is schematically depicted.

In FIG. 7, an embodiment of a flowchart of the responding node is shown. The responding node stores the sending timestamp T1 in a vector A, and the receiving timestamp T2 in the vector B. The sequence number is used as an index in the vector. The overhead of sending a message Kr is computed initially. This is the difference in time from when the timestamp was taken and when the message was actually sent. Kr may be set to 0 if the node lacks the capability to compute this time.

The second synchronisation phase is in this embodiment similar to phase P1 described above. The differences are as follows:
1. The two processes are called P3A and P3B instead of P1A and P1B, respectively.
2. The resulting variables are named CABS1 and CDIFF1 instead of CABS0 and CDIFF0, respectively.
3. After successful completion of the processes, both flowchart goes to P4 instead of to P2A and P2B.

In the interpolation phase, the measurements collected in phase P2 in the vectors A[ ] and B[ ] and the synchronization values CABS0, CDIFF0, CABS1 and CDIFF1 in phases P1 and P3 are used to interpolate a sequence of one-way latency values. The method itself can be performed on the requesting node, the responding node, or some other node, and can be performed at any time after the other three phases. For example, this phase can be made as a post processing stage in a server. However, the data must be transferred to the place where the method is implemented. The end result of the method is a vector L[ ], i.e. the latency profile, with size NM containing the true one-way latency values of the measurement between the requesting and responding node.

Figure 8:
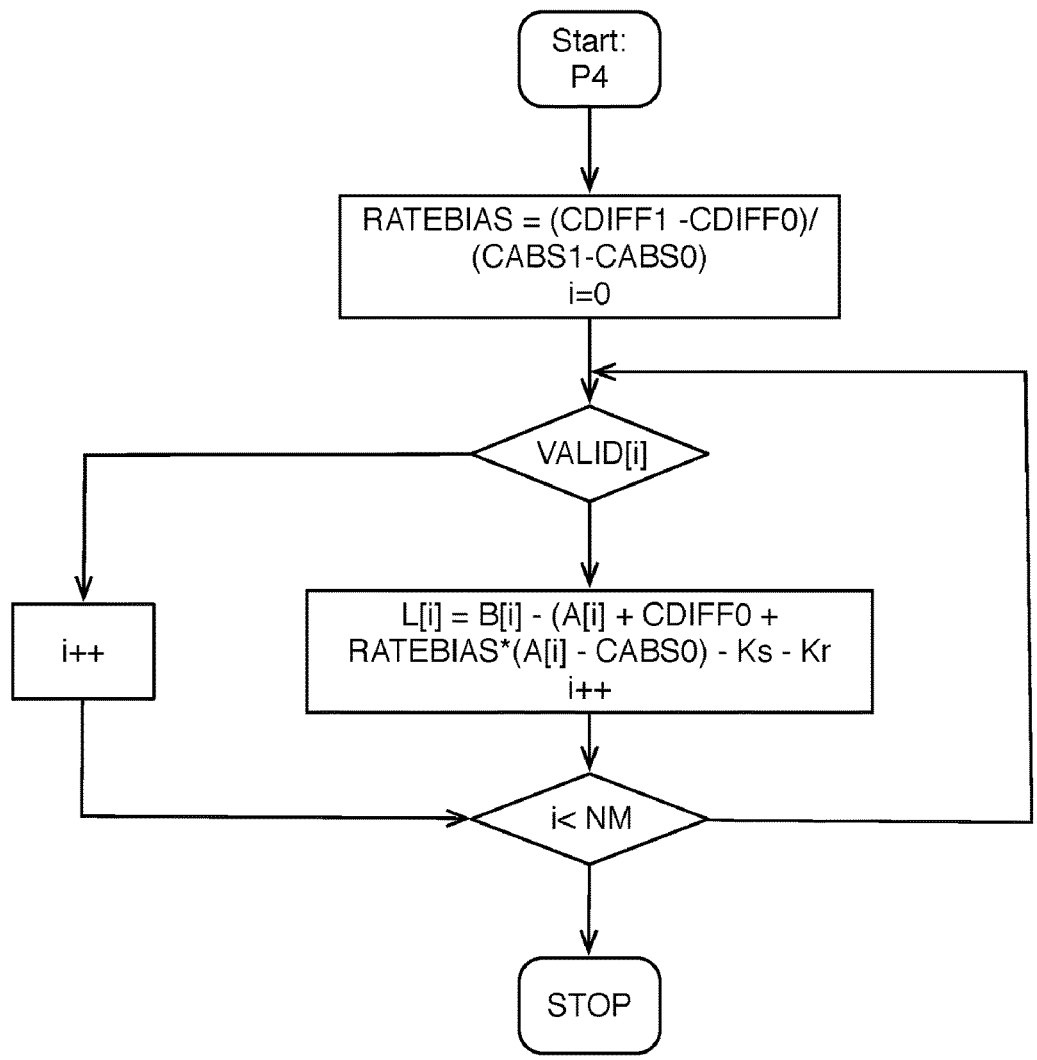
In FIG. 8, an embodiment of a flowchart of the interpolation method is schematically depicted.

In FIG. 8, an embodiment of a flowchart of the interpolation method is schematically depicted. First the difference in rate RATEBIAS is computed as follows:

RATEBIAS=(CDIFF1−CDIFF0)/(CABS1−CABS0),

The method iteratively computes the values of the one-way latency vector L[ ] from values collected or computed, as follows:

$L[i]=B[i]-(A[i]+CDIFF0+RATEBIAS*(A[i]-CABS0))-Ks-Kr.$

The invention claimed is:

1. A method for generating a one-way latency profile in a network comprising:
transmitting a plurality of pre-synchronization messages between a requester node comprising a first clock and a responder node comprising a second clock;
calculating, a pre-synchronization offset value between said first clock and said second clock, using data in one of said pre-synchronization messages;
transmitting a plurality of measuring messages comprising a sending time between said requester node and said responder node;
recording, by said responder node, said sending time and a receiving time of each of said measuring messages;
transmitting a plurality of post-synchronization messages between said requester node and said responder node;
calculating, using a post-synchronization data set contained in one of said post-synchronization messages, a post-synchronization offset value between said first clock and said second clock;
interpolating said sending and receiving times of said measuring messages with said pre-synchronization offset value and said post-synchronization offset value to generate said one-way latency profile.

2. The method of claim 1, wherein each pre-synchronization message has a minimum round trip time.

3. The method of claim 2, wherein said round trip time is calculated according to $T_{i,4}-T_{i,1}-(T_{i,3}-T_{i,2})$, where i is in an interval [1 . . . N], N is the number of said pre-synchronization messages sent by said requester node, $T_{i,1}$ is a first timestamp of said requester node sending said pre-synchronization messages, $T_{i,2}$ is a second timestamp of said responder node receiving said pre-synchronization messages, $T_{i,3}$ is a third timestamp of said responder node sending said pre-synchronization messages, and $T_{i,4}$ is a fourth timestamp of said requester node receiving said pre-synchronization messages.

4. The method of claim 1, wherein said pre-synchronization offset value is calculated according to $((T_2-T_1)+(T_3-T_4))/2$, where $T_1$ is a first timestamp of said requester node sending said pre-synchronization messages, $T_2$ is a second timestamp of said responder node receiving said pre-synchronization messages, $T_3$ is a third timestamp of said responder node sending said pre-synchronization messages, and $T_4$ is a fourth timestamp of said requester node receiving said pre-synchronization messages.

5. The method of claim 4, further comprising: setting a pre-synchronization absolute clock value as said fourth timestamp of said requester node receiving said pre-synchronization messages.

6. The method of claim 1, further comprising: measuring an overhead of said requester node to send said measuring messages.

7. The method of claim 1 further comprising: measuring an overhead of said responder node to receive said measuring messages.

8. The method of claim 1, wherein each post-synchronization message has a minimum round trip time.

9. The method of claim 8, wherein said round trip time is calculated according to $T_{i,4}-T_{i,1}-(T_{i,3}-T_{i,2})$, where i is in an interval [1 . . . N], N is the number of said post-synchronization messages sent by said requester node, $T_{i,1}$ is a first timestamp of said requester node sending said post-synchronization messages, $T_{i,2}$ is a second timestamp of said responder node receiving said post-synchronization messages, $T_{i,3}$ is a third timestamp of said responder node sending said post-synchronization messages, and $T_{i,4}$ is a fourth timestamp of said requester node receiving said post-synchronization messages.

10. The method of claim 1, wherein said post-synchronization offset value is calculated according to $((T_2-T_1)+(T_3-T_4))/2$, where $T_1$ is a first timestamp of said requester node sending said post-synchronization messages, $T_2$ is a second timestamp of said responder node receiving said post-synchronization messages, $T_3$ is a third timestamp of said responder node sending said post-synchronization messages and $T_4$ is a fourth timestamp of said requester node receiving said post-synchronization messages.

11. The method of claim 10, further comprising: setting a post-synchronization absolute clock value as said fourth timestamp of said requester node receiving said post-synchronization messages.

12. The method of claim 1, wherein said interpolation comprises calculating a rate bias according to rate_bias= (CDIFF1−CDIFF0)/(CABS1−CABS0), where CDIFF1 is said post-synchronization offset value, CDIFF0 is said pre-synchronization offset value, CABS1 is said post-synchronization absolute clock value, and CABS0 is said pre-synchronization absolute clock value.

13. The method of claim 12, wherein said one-way latency profile between said requester node and said responder node is calculated according to $Ti._2-Ti._1+$ CDIFF0+rate_bias*$(Ti._1-CABS0)-Ks-Kr$, where i is in an interval [1 . . . N], N is the number of said measuring messages sent by said requester node, $Ti._1$ is a first timestamp of said requester node sending said measuring messages, $Ti._2$ is a second timestamp of said responder node receiving said measuring messages, CDIFF0 is said pre-synchronization offset value, rate_bias is said rate bias, CABS0 is said pre-synchronization absolute clock value, Ks is said overhead of said requester node, and Kr is said overhead of said responder node.

14. The method of claim 1, wherein said plurality of pre-synchronization messages, said plurality of measuring messages, and said plurality of post-synchronization messages are encapsulated using a UDP/IP protocol.

15. The method of claim 1 wherein said plurality of pre-synchronization messages, said plurality of measuring messages, and said plurality of post-synchronization messages are encoded using a RTP protocol.

16. A system to calculate a one-way latency profile between a requester node coupled to a first clock and a responder node coupled to a second clock, comprising:
a first network module executing on said responder node to calculate a pre-synchronization offset value between said first clock and second clock based on one or more of a plurality of pre-synchronization messages transmitted by a second network module executing on a second processor on said requester node to said first module;
said second network module transmitting a plurality of measuring messages comprising a sending time to said first network module;
said first network module recording the sending time and a receiving time of the measuring messages;
said first network module calculating a post-synchronization offset value between said first clock and second clock based on a plurality of post-synchronization messages transmitted between said requester node and a second network module executing on said responder node; and
said first network module interpolating said sending and receiving times with said pre-synchronization offset value and post-synchronization offset value to generate said one-way latency profile from said plurality of latency measurements.

17. The system of claim 16, wherein said pre-synchronization offset value and said pre-synchronization absolute clock value are calculated from said pre-synchronization messages.

18. The system of claim 17, wherein each pre-synchronization message has a minimum round trip time.

19. The system of claim 18, wherein said round trip time is calculated according to $T_{i,4}-T_{i,1}-(T_{i,3}-T_{i,2})$, where i is in an interval [1 . . . N], N is the number of said pre-synchronization messages sent by said requester node, $T_{i,1}$ is a first timestamp of said requester node sending said pre-synchronization messages, $T_{i,2}$ is a second timestamp of said responder node receiving said pre-synchronization messages, $T_{i,3}$ is a third timestamp of said responder node sending said pre-synchronization messages, and $T_{i,4}$ is a fourth timestamp of said requester node receiving said pre-synchronization messages.

20. The system of claim 19, wherein said pre-synchronization absolute clock value is set as said fourth timestamp of said requester node receiving said pre-synchronization messages.

21. The system of claim 16, wherein said pre-synchronization offset value is calculated according to $((T_2-T_1)+(T_3-T_4))/2$, where $T_1$ is a first timestamp of said requester node sending said pre-synchronization messages, $T_2$ is a second timestamp of said responder node receiving said pre-synchronization messages, $T_3$ is a third timestamp of said responder node sending said pre-synchronization messages, and $T_4$ is a fourth timestamp of said requester node receiving said pre-synchronization messages.

22. The system of claim 16, wherein said post-synchronization offset value and said post-synchronization absolute clock value are calculated from said post-synchronization messages.

23. The system of claim 22, wherein each post synchronization message has a minimum round trip time.

24. The system of claim 23, wherein said round trip time is calculated according to $T_{i,4}-T_{i,1}-(T_{i,3}-T_{i,2})$, where i is in an interval [1 . . . N], N is the number of said post-synchronization messages sent by said requester node, $T_{i,1}$ is a first timestamp of said requester node sending said post-synchronization messages, $T_{i,2}$ is a second timestamp of said responder node receiving said post-synchronization messages, $T_{i,3}$ is a third timestamp of said responder node sending said post-synchronization messages, and $T_{i,4}$ is a fourth timestamp of said requester node receiving said post-synchronization messages.

25. The system of claim 23, wherein said post-synchronization absolute clock value is set as said fourth timestamp of said requester node receiving said post-synchronization messages.

26. The system of claim 16, wherein said post-synchronization offset value is calculated according to $((T_2-T_1)+(T_3-T_4))/2$, where $T_1$ is a first timestamp of said requester node sending said post-synchronization messages, $T_2$ is a second timestamp of said responder node receiving said post-synchronization messages, $T_3$ is a third timestamp of said responder node sending said post-synchronization messages, and $T_4$ is a fourth timestamp of said requester node receiving said post-synchronization messages.

27. The system of claim 26, wherein said one-way latency profile between said requester node and said responder node is calculated according to $Ti._2-Ti._1+$CDIFF0+rate_bias*$(Ti._1-CABS0)-Ks-Kr$, where i is in an interval [1 . . . N], N is the number of said predetermined number of measuring messages sent by said requester node, $Ti._1$ is a first timestamp of said requester node sending said measuring messages, $Ti._2$ is a second timestamp of said responder node receiving said measuring messages, CDIFF0 is said pre-synchronization offset value, rate_bias is said rate bias, CABS0 is said pre-synchronization absolute clock value, Ks is said overhead of said requester node, and Kr is said overhead of said responder node.

28. The system of claim 16, further comprising: calculating a rate bias according to rate_bias=(CDIFF1−CDIFF0)/(CABS1−CABS0), where CDIFF1 is said post-synchronization offset value, CDIFF0 is said pre-synchronization offset value, CABS1 is said post-synchronization absolute clock value, and CABS0 is said pre-synchronization absolute clock value.

29. The system of claim 16, wherein said plurality of pre-synchronization messages, said predetermined number of measuring messages, and said plurality of post-synchronization messages are encapsulated using a UDP/IP protocol.

30. The system of claim 16 wherein said plurality of pre-synchronization messages, said predetermined number of measuring messages, and said plurality of post-synchronization messages are encoded using a RTP protocol.

31. A system to determine a one-way latency between nodes in a network, comprising:
   a first node, wherein the first node is configured to send a first message and determine a first value T1 indicative of a time the first message is sent, and wherein the first node is configured to receive a second message and determine a second value indicative of a time T4 the second message is received;
   a second node, wherein the second node is configured to receive the first message from the first node and determine a third value T2 indicative of a time the first message is received, and wherein the second node is configured to send the second message to the first node and determine a fourth value indicative of a time T3 the second message is sent;
   a first clock, wherein the first clock determines time T1 and time T4;
   second clock, wherein the second clock determines time T2 and time T4; and said first node generating said one-way latency profile from a combination of the times, T1, T2, T3, and T4.

32. The system of claim 31, wherein the first clock and the second clock are not synchronized.

* * * * *